United States Patent [19]
Chopping

[11] Patent Number: 5,883,900
[45] Date of Patent: Mar. 16, 1999

[54] TELECOMMUNICATIONS TRANSMISSION

[75] Inventor: Geoffrey Chopping, Wimborne, United Kingdom

[73] Assignee: GPT Limited, Coventry, United Kingdom

[21] Appl. No.: 762,967

[22] Filed: Dec. 6, 1996

Related U.S. Application Data

[63] Continuation-in-part of Ser. No. 408,732, Mar. 22, 1995, abandoned.

[30] Foreign Application Priority Data

Mar. 23, 1994 [GB] United Kingdom .................. 9405748

[51] Int. Cl.$^6$ ..................................................... H04J 3/06
[52] U.S. Cl. ........................... 370/506; 370/516; 370/535; 375/371
[58] Field of Search .................................... 370/506, 516, 370/517, 518, 535, 538, 543; 375/371, 372

[56] References Cited

U.S. PATENT DOCUMENTS

| | | | |
|---|---|---|---|
| 5,111,485 | 5/1992 | Serack ..................................... | 370/506 |
| 5,142,529 | 8/1992 | Parruck et al. ......................... | 370/545 |
| 5,172,376 | 12/1992 | Chopping et al. ..................... | 370/517 |
| 5,255,293 | 10/1993 | Archer et al. ........................... | 375/372 |
| 5,260,940 | 11/1993 | Urbansky ................................ | 370/465 |
| 5,268,936 | 12/1993 | Bernardy ................................. | 370/516 |
| 5,331,641 | 7/1994 | Parruck et al. ......................... | 370/506 |
| 5,357,514 | 10/1994 | Yoshida .................................... | 370/506 |
| 5,471,511 | 11/1995 | De Langhe et al. .................... | 375/371 |
| 5,598,445 | 1/1997 | Castano Pinto et al. ............... | 370/506 |

Primary Examiner—Min Jung
Attorney, Agent, or Firm—Kirschstein, et al.

[57] ABSTRACT

A telecommunications transmission system carries multiple tributary data streams with SDH compatible multiplexing and demultiplexing arrangements that include a tributary justification algorithm utilizing both byte and bit justification means as well as a double-ended payload protocol. The byte justification means employs an offset clock with a nominal constant frequency offset from the transmission system clock so that the offset clock can be used to force regular rate of byte justifications of constant sign. The bit justification means employs the difference between the tributary clock and the offset clock to determine the bit justifications necessary to multiplex the tributary data stream and the bit justifications are normally of complementary sign to the forced regular byte justifications except where the frequency of the offset clock lies between the frequency of the transmission clock.

8 Claims, 4 Drawing Sheets

| | Old Register States | | | New Register States | | | ADJUST TRIBUTARY CLOCK |
|---|---|---|---|---|---|---|---|
| | Near End | Far End | Residual | Near End | Far End | Residual | |
| EXTRA NEAR End Tributary Pointer Decrement (negative justification) | 0 POS* MAX NEG 0 0 0 | 0 0 0 0 POS NEG NEG | D/C D/C D/C D/C D/C NOT R R | INC 1 INC MAX INC 1 0 0 0 | 0 1 0 0 DEC 1 INC 1 INC 1 | N/C N/C N/C N/C N/C INC 1 R | none none ADVANCE none none none ADVANCE |
| MISSING NEAR End Tributary Pointer Decrement (negative justification) | 0 POS NEG* MIN 0 0 0 | 0 0 0 0 POS POS NEG | D/C D/C D/C D/C NOT 0 0 D/C | DEC 1 DEC 1 DEC 1 MIN 0 0 0 | 0 0 0 0 DEC 1 DEC 1 INC 1 | N/C N/C N/C N/C DEC 1 0 N/C | none- none none RETARD none RETARD none |
| EXTRA FAR End Tributary Pointer Decrement (negative justification) | 0 POS NEG NEG 0 0 0 | 0 0 0 0 POS* MAX NEG | D/C D/C NOT 0 0 D/C D/C D/C | 0 DEC 1 DEC 1 INC 1 0 0 0 | INC 1 0 0 0 INC 1 MAX INC 1 | N/C N/C DEC 1 0 N/C N/C N/C | none none none RETARD none none- none |
| MISSING FAR End Tributary Pointer Decrement (negative justification) | 0 POS POS NEG 0 0 0 | 0 0 0 0 POS NEG* MIN | D/C NOT R R D/C D/C D/C D/C | 0 DEC 1 DEC 1 INC 1 0 0 0 | DEC 1 0 0 0 DEC 1 DEC 1 MIN | N/C INC 1 R N/C N/C N/C N/C | none none ADVANCE none none none none |
| | Near End | Far End | Residual | Near End | Far End | Residual | ADJUST TRIBUTARY CLOCK |
| | Old Register States | | | New Register States | | | |

| Old Register States Near End / Far End / Residual | New Register States Near End / Far End / Residual | ADJUST TRIBUTARY CLOCK |
|---|---|---|
| EXTRA NEAR End Tributary Pointer Decrement (negative justification) <br> 0　　　0　　　D/C <br> POS*　0　　　D/C <br> MAX　0　　　D/C <br> NEG　0　　　D/C <br> 0　　　POS　D/C <br> 0　　　NEG　NOT R <br> 0　　　NEG　R | INC 1　0　　　N/C <br> INC　　1　　　N/C <br> MAX　0　　　N/C <br> INC 1　0　　　N/C <br> 0　　　DEC 1　N/C <br> 0　　　INC 1　INC 1 <br> 0　　　INC 1　R | none <br> none <br> ADVANCE <br> none <br> none <br> none <br> ADVANCE |
| MISSING NEAR End Tributary Pointer Decrement (negative justification) <br> 0　　　0　　　D/C <br> POS　0　　　D/C <br> NEG*　0　　　D/C <br> MIN　0　　　D/C <br> 0　　　POS　NOT 0 <br> 0　　　POS　0 <br> 0　　　NEG　D/C | DEC 1　0　　　N/C <br> DEC 1　0　　　N/C <br> DEC 1　0　　　N/C <br> MIN　0　　　N/C <br> 0　　　DEC 1　DEC 1 <br> 0　　　DEC 1　0 <br> 0　　　INC 1　N/C | none <br> none <br> none <br> RETARD <br> none <br> RETARD <br> none |
| EXTRA FAR End Tributary Pointer Decrement (negative justification) <br> 0　　　0　　　D/C <br> POS　0　　　D/C <br> NEG　0　　　NOT 0 <br> NEG　0　　　0 <br> 0　　　POS*　D/C <br> 0　　　MAX　D/C <br> 0　　　NEG　D/C | 0　　　INC 1　N/C <br> DEC 1　0　　　N/C <br> DEC 1　0　　　DEC 1 <br> INC 1　0　　　0 <br> 0　　　INC 1　N/C <br> 0　　　MAX　N/C <br> 0　　　INC 1　N/C | none <br> none <br> none <br> RETARD <br> none <br> none <br> none |
| MISSING FAR End Tributary Pointer Decrement (negative justification) <br> 0　　　0　　　D/C <br> POS　0　　　NOT R <br> POS　0　　　R <br> NEG　0　　　D/C <br> 0　　　POS　D/C <br> 0　　　NEG*　D/C <br> 0　　　MIN　D/C | 0　　　DEC 1　N/C <br> DEC 1　0　　　INC 1 <br> DEC 1　0　　　R <br> INC 1　0　　　N/C <br> 0　　　DEC 1　N/C <br> 0　　　DEC 1　N/C <br> 0　　　MIN　N/C | none <br> none <br> ADVANCE <br> none <br> none <br> none <br> none |
| Near End / Far End / Residual <br> Old Register States | Near End / Far End / Residual <br> New Register States | ADJUST TRIBUTARY CLOCK |

FIG.1

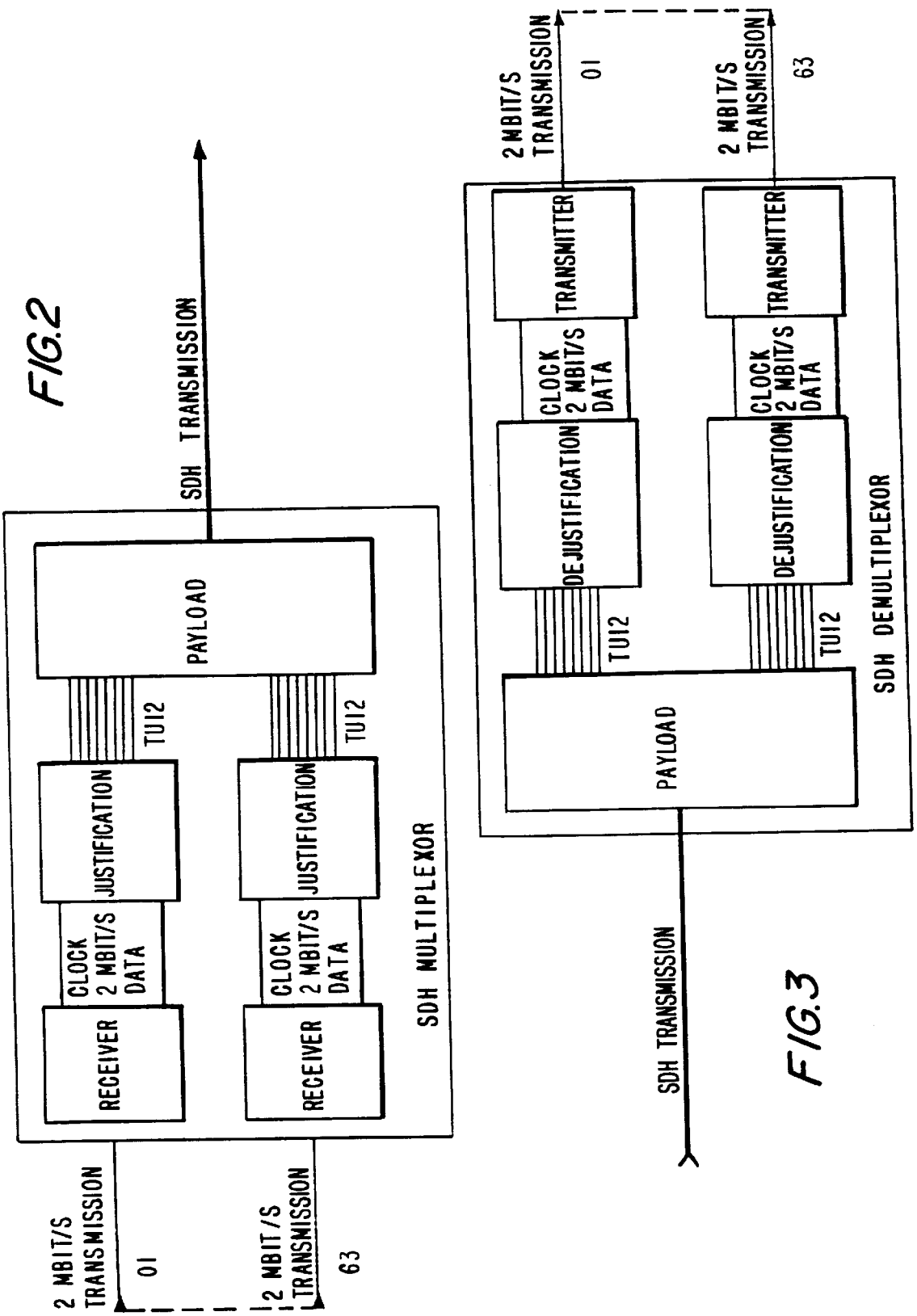

TELECOMMUNICATIONS TRANSMISSION

This application is a continuation-in-part of application Ser. No. 08/408,732 (abandoned).

BACKGROUND OF THE INVENTION

FIELD OF THE INVENTION

The present invention concerns the digital transmission of data and in particular data transmitted by the multiplexing method known as SDH (Synchronous Digital Hierarchy).

There are two separate justification techniques at the Virtual Container 12 (VC12) level within Synchronous Digital Hierarchy (SDH). They are both used at the same time within SDH, but not in the initial justification process at the entry point to the SDH network.

By initially using both techniques, Complementary Justification eliminates the possibility of a large amount of wander being introduced by an SDH network.

Reducing the amount of network wander enables the size of any boundary buffer to be reduced.

The fitting of boundary buffers on the exit from the SDH network can greatly reduce the relative wander.

Multiplexing techniques enable a multiplicity of data streams often called tributaries to be carried by a single transmission system. When a tributary data stream has a clock rate which is independent of the clock rate of the transmission system then justification techniques are required in order to maintain the integrity of the tributary data stream. When a transmission system is demultiplexed the individual tributary clocks have to be recreated in order to recreate the tributary data streams. The accuracy with which the tributary clocks are recreated is dependent on the initial justification and the final dejustification/desynchronization techniques employed as well as any intermediate network rejustification techniques used within the intermediate transmission network.

The poor performance of the justification techniques specified by the SDH recommendations compared with the earlier justification techniques employed by the Plesiochronous Digital Hierarchy resulted in U.S. Pat. No. 5,172,376 imported herein by reference. However although the technique described performs very well it has not been included in the SDH recommendations. To implement that technique requires the intermediate network rejustifiers within a network as well as the initial justification functions and final dejustification/desynchronisation functions to be modified. The overall performance of the present invention although inferior to the above mentioned patent has the advantage of only requiring the modification of the initial justification function for the basic implementation and both the initial justification and the final dejustification/desynchronisation function for the double-ended implementation.

The poor performance of the justification techniques specified by the SDH recommendations is caused by several factors including: the use of positive/zero/negative justification; the use of byte justification; the use of large amounts of hysteresis; and the use of irregular spaced multiplex formats. The problem of irregular spaced multiplexed formats can be overcome by the use of certain internal design techniques. The problems caused by the use of large amounts of hysteresis with positive/zero/negative byte for all intermediate network rejustification functions cannot be overcome if the normal operating methods as described by the SDH recommendations are followed.

The use of positive/zero/negative justification is intended to minimize the number of justification actions. Unfortunately this also minimizes the amount of phase control information carried by the transmission system with a consequential degradation of the overall transfer characteristics.

The use of either byte justification or bit justification for the initial justification is permitted by the SDH recommendations for tributaries although not for the high bandwidth AU (Administration Unit) payloads. When the initial rejustification used is bit justification and there are intermediate network byte rejustification functions then the dejustification/desynchronization function has to be able to accept both bit and byte justifications.

For SDH the justification actions can be infrequent occurrences because tributary clocks and the transmission clock are all multiples of 8 kHz although not necessarily the same 8 kHz source.

SUMMARY OF THE INVENTION

According to the present invention there is provided a telecommunications transmission system carrying multiple tributary data streams with SDH compatible multiplexing and demultiplexing arrangements that include a tributary justification algorithm utilising both byte and bit justification means, wherein the byte justification means employs an offset clock with a nominal constant frequency offset from the transmission clock so that the offset clock can be used to force a regular rate of byte justifications of constant sign; and wherein the bit justification means employs the difference between the tributary clock and the offset clock to determine the bit justifications necessary to multiplex the tributary data stream; and wherein the bit justifications are normally of complementary sign to the forced regular byte justifications except where the frequency of the offset clock lies between the frequency of the transmission clock and the frequency of the tributary clock.

BRIEF DESCRIPTION OF THE DRAWING

The present invention will now be described by way of example, with reference to the accompanying figures, wherein:

FIG. 1 is a table showing the effect of a double-ended complementary justification Tributary Clock adjustment algorithm using regular forced pointer negative byte justifications and payload bit justifications;

FIG. 2 shows a block diagram of an SDH Multiplexer for use in the present invention;

FIG. 3 shows a block diagram of an SDH Demultiplexer for use in the present invention;

DESCRIPTION OF THE PREFERRED EMBODIMENTS

Figure 4:
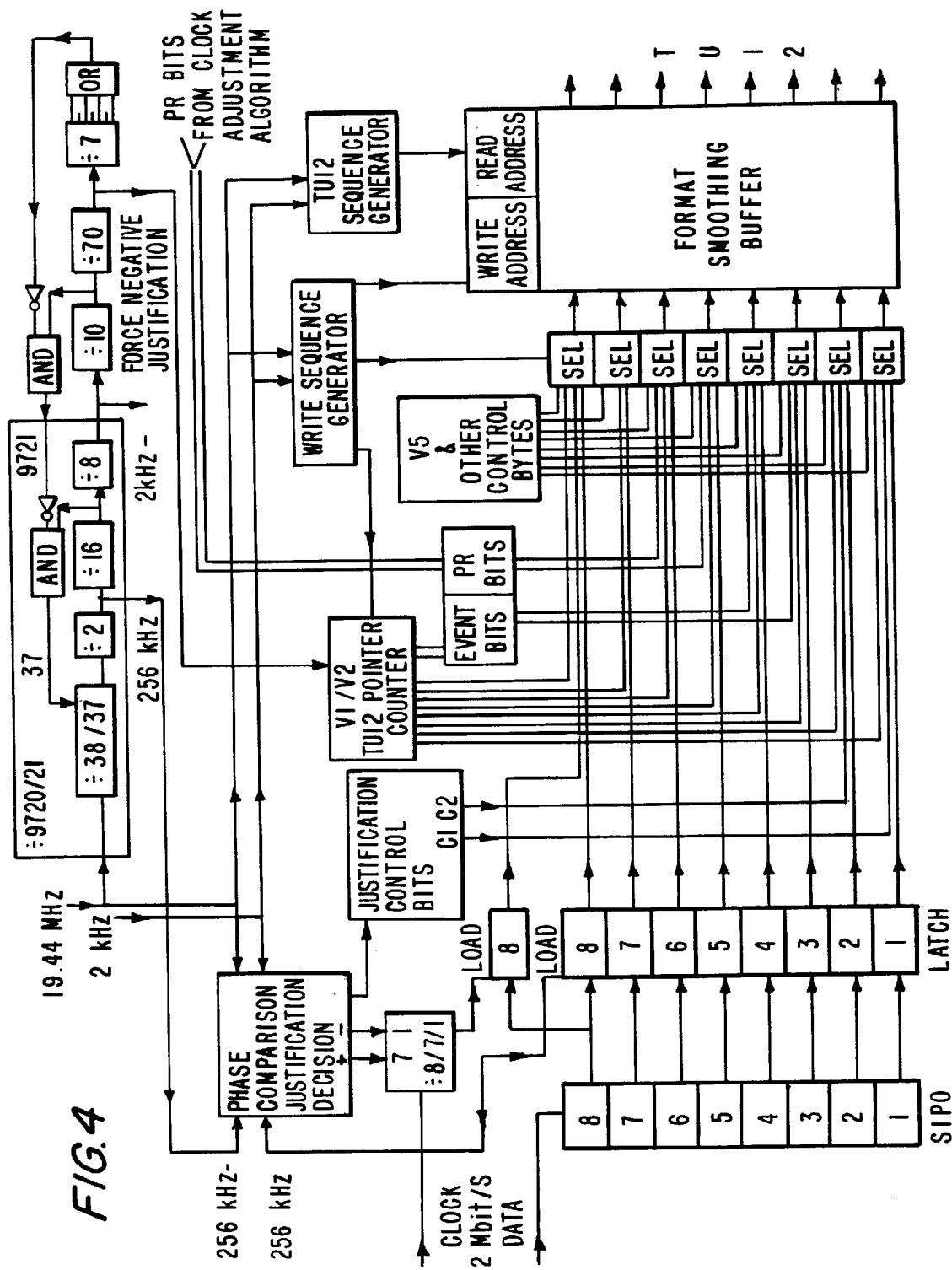
FIG. 4 shows the justification block of FIG. 2 in greater detail.
Figure 5:
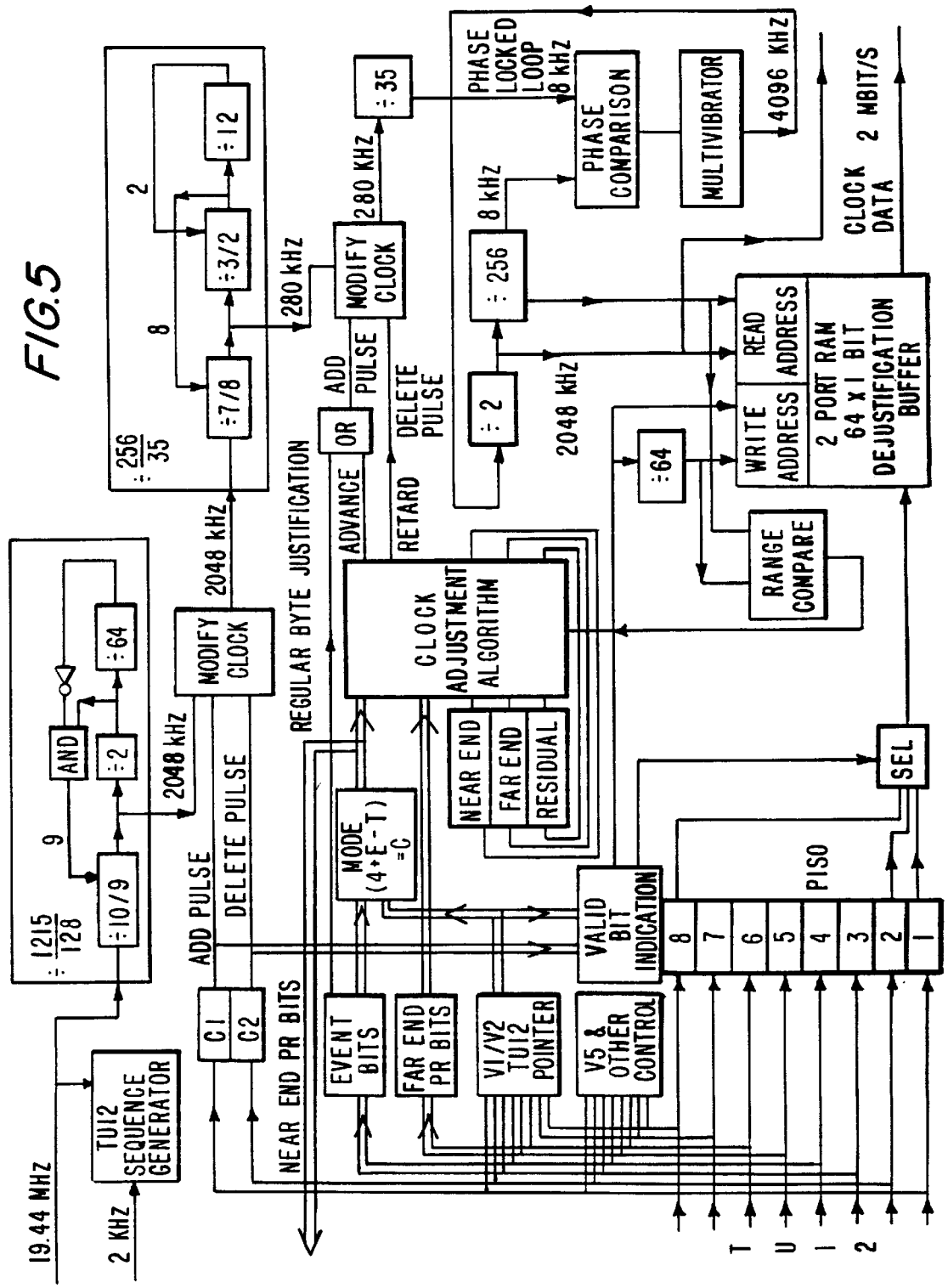
FIG. 5 shows the dejustification block of FIG. 3 in greater detail.

The use of both bit and byte justifications by the initial justification function can result in a considerable change in the overall transfer characteristics and also a considerable increase in the number of justification actions. In practice in order to achieve the correct overall tributary data transfer rate the bit and byte justifications must normally be of a complementary nature.

A means of achieving complementary justification is by regularly forcing one type of justification, for example, by forcing a regular byte justification. These could be either regular negative or regular positive byte justifications. Whichever is chosen, it is important to eliminate the occurrence of the other form of byte justification.

The worst permitted case of an SDH clock is +/−4.6 p.p.m. (parts per million) namely a range of 9.2 p.p.m. and 3 byte justifications per second correspond to 10.71 p.p.m. Such a forced justification rate would ensure that the hysteresis of all the intermediate network rejustifiers in a path are effectively held towards one end of their hysteresis range thereby preventing the very considerable occasional wander effect that can be introduced by having many intermediate network rejustifiers each with a large hysteresis range.

The normal bit justification mechanism can still accommodate the plesiochronous nature of the tributary to be carried. Although the bit justifications will normally be of a complementary sense to the byte justifications this may not be the case for a tributary having a significant plesiochronous frequency offset. Although complementary justification could be operated with regular bit justifications, it would not be effective in reducing the hysteresis effects of SDH tributary byte rejustification functions.

The use of regular positive byte justifications leads to less bytes being sent and therefore the rejustification buffers are less full and the network delay is minimised.

Although intermediate network rejustifiers should allocate the same period of (500/140) 3.57 microseconds to each VC12 (Virtual Container 12) justification action, some rejustifiers may not do so. Positive justification can lead to 2 successive bytes of a TU12 (Tributary Unit 12) not being part of a VC12; whereas with negative justification only one byte (a V byte) can be omitted at a time. The non-linear transfer of justification actions by intermediate network rejustifiers is a problem for some designs of rejustifiers and it is worse for regular positive justifications.

The Floating Asynchronous Bit Mapping method is one of the methods recommended by SDH for the initial tributary justification; and as recommended enables bit justifications to be used to compensate for variations of frequency and phase of the tributary to be carried to within a sampling error of one bit period. If there are no regular byte justifications those variations of frequency and phase would be relative to the transmission clock. By introducing regular byte justifications, those frequency and phase variations are now relative to an offset clock which has a fixed frequency offset to the transmission clock. With regular byte justifications the tributary clock is now running at a different rate to the offset clock and consequently bit justifications will occur in a complementary sense to the regular byte justifications.

A means of generating the offset clock from the transmission clock is by using digital frequency synthesis. The peak phase error of such an offset clock depends on the size of the correction step used. Using such an offset clock can reduce the tributary sampling error to the size of the correction step.

An average rate of 21.94 bit justifications per second correspond to 3 VC12 byte justifications per second, these being equivalent to a frequency offset of 10.71 p.p.m. or a phase shift of 10.71 microseconds per second. These justification rates should be satisfactorily handled by the current dejustification/desynchronisation functions.

Although the complementary justification method described above removes the very considerable wander effects that can be introduced by having hysteresis at each of the intermediate network rejustifiers, it prevents neither the previously mentioned effects of the non-linear transfer of justification actions by intermediate network rejustifiers nor the occasional justification actions caused by phase variations between the various rejustification clocks used across an SDH network. Hereinafter this latter effect is referred to as clock tree variations.

The performance of complementary justification can be considerably improved by using double-ended complementary justification. Double-ended complementary justification still requires regular byte justifications and tributary dependent bit justifications to be inserted by the initial justification function.

For double-ended complementary justification the initial justification function also inserts a copy of the two least significant bits of the SDH tributary pointer value (for example the TU12 pointer for a tributary carrying 2048 kbit/s) into one of the stuff bytes of the VC12 payload. These two bits are hereinafter referred to as the event bits because when they change state they indicate the time each forced justification event occurred.

The SDH recommendations expect intermediate network rejustifiers to perform processing functions on the tributary pointers whilst leaving the contents of the payload unaltered. Consequently the final dejustification/desynchronisation function receives the processed TU12 tributary pointer as well as the two unprocessed event bits.

Normally for every received change to the event bits there will be a subsequent corresponding change in the tributary pointer. For this case there is a constant mathematical relationship between the two event bits (E) and the two least significant bits of the received tributary pointer (T) providing an allowance is made for the natural lag of the tributary pointer introduced by the processing of the intermediate rejustifiers. Such a relationship is:

(4+E−T) modulo 4=Constant.

In practice sometimes there is no corresponding change in T and consequently the relationship indicates one of 4 phase relationships, that can be represented by 2 phase relationship bits. As the changes to the event bits occur at a regular rate appropriate changes in the phase relationship bits can be interpreted as a missing tributary pointer change or an extra tributary pointer change.

Ideally the only phase changes that should lead to adjustments to the phase output of the dejustification/desynchronisation function are phase changes that occur between the transmission clock references of the initial justification function and the final dejustification/desynchronisation function. However there are several other effects that introduce phase movements which include: clock tree variations; temperature effects; as well as non-linear transfer of justification actions by intermediate network rejustifiers; which can all lead to changes of the 2 phase relationship bits.

Because of the duplex nature of the SDH transmission a dejustification/desynchronisation function is associated with the initial justification function for the duplex path. Once the 2 phase relationship bits have been determined a copy of the 2 bits is inserted into another part of the VC12 stuff byte used to carry the 2 event bits of the duplex path.

This means that the 2 sets of phase relationship bits which have been calculated at each end of the link are available at both ends of the link. This double-ended technique enables missing tributary pointer changes and extra tributary pointer changes that occur at the initial justification function end of a duplex link to be deduced at the dejustification/desynchronisation function end of the link.

The double-ended complementary justification method of the present invention relies on the provision of complementary justification as well as the inclusion in the payload of a 2 bit event field and a 2 bit phase relationship field, from this additional information it is possible to create a more accurate tributary clock.

The present invention will now be further described by way of the following example.

As already mentioned complementary justification introduces regular byte justifications which equates to performing bit justifications relative to an offset clock. Ideally the offset clock would have a uniform bit period, however in practice it has to be formed from an internal clock such as the 19.44 MHz clock which is one eighth of the 155.52 MHz STM-1 line clock rate.

A means of achieving an offset clock that equates to one forced byte justification every 2800 frames of 125 $\mu$s (that is 350 ms) is to have a counter which normally counts to 9720 and is clocked by the 19.44 MHz clock to produce ajustification period of 500 $\mu$s. The counter is also able to count to a value which differs from 9720 by 1. The counter is normally arranged to count by this different value every tenth loop of 500 $\mu$s namely a period of 5 ms. Every 70 such periods of 5 ms (350 ms) a forced byte justification occurs. Sometimes when a forced justification occurs the different count value is not used. Four times out of seven the different count value is not used, namely the first; third; fifth and seventh occasions out of a loop of seven. Using these count values the following performance is achieved for a TU12 tributary:

approximately 2.85 regular byte justifications per second;

140 forced byte justifications giving a total phase shift of (140×500/140) 500 $\mu$s in the (140×0.35) 49.0 seconds of a complementary cycle;

9720 count loop adjustments giving a total phase shift of (9720/19440000) 500 $\mu$s in 49.0 seconds of a complementary cycle;

an offset frequency of approximately (500/49) 10.2 p.p.m. giving approximately (10.2×2.048) 20.9 bit justifications per second.

Width normal positive/zero/negative bit justification the sampling error is one bit; whilst with positive only or negative only justification the accuracy can be much better. Because the resulting offset clock has a peak to peak jitter of 0.052 $\mu$s and the beat loop of the transmission clock to the offset clock is very long (7×350 ms) the resulting sampling accuracy of the bit justification method is much better than 1 bit.

The addition of 2 event bits and 2 phase relationship bits to the tributary payload formed by a complementary justification function provides the transfer format for double-ended complementary justification. As described above by carrying the 2 event bits and the two phase relationship bits in both paths of a duplex SDH tributary payload the occurrence of missing tributary pointer changes and extra tributary pointer changes at either end of the link are known at both ends of the link.

In addition to the normal functions required to perform the dejustification/desynchronisation functions of a transmission multiplexor; and the double-ended complementary arrangements already described a decision function is required which can retain some historical information relating to the earlier received information.

A means for holding such information is by the use of registers that can be incremented and decremented. For the algorithm herein described three such registers are used at each end of the link.

The near end register N can contain values in the range +N to −N.

The far end register F can contain values in the range +F to −F.

The residual register R can contain values in the range 0 to R where R is a positive integer.

An important characteristic is that either N or F must be zero. On initialisation N and Fare both set to 0.

The size of +/−N and +/−F is dependent on the size of the buffer contained within the dejustification/desynchronisation function and relates to the number of bytes of phase shift that can be introduced by the dejustification/desynchronisation function to compensate for the phase shifts occurring within the SDH transmission network.

The size of R relates to the amount of hysteresis that is introduced by the residual register R.

For example if the residual register R is permitted to only be able to contain the values of, +2+1 or 0 (R=2), this would result in 2×3.57 $\mu$s of added hysteresis. Other values can be chosen and the dejustification/desynchronisation function used can be programmable to accept different values of R for different working situations.

For the transfer characteristic to be both responsive and stable the permitted range of the residual register range R can be automatically adjusted so that it is equal to a function of the recorded operating range: for example the permitted range of the residual register could be set to equal the peak recorded operating range of R over a specified number of complementary cycle periods; or to equal the peak recorded operating range of R+1 over a specified number of complementary cycle periods.

Because a complementary cycle is quite a long period of time and provided the peak recorded operating range of R is made available to the multiplexing control function it is possible for the automatic adjustment of the residual register range to be controlled by the multiplexing control function.

One principle of the described algorithm for controlling the phase of the recreated tributary clock relies on the dejustification/desynchronisation function accepting the validity of all the justification information contained within the payload namely the bit justifications and all the byte justifications indicated by the event bits provided the changes to the event bits are persisted for three successive occurrences. The algorithm also only accepts near end missing tributary pointer changes and extra tributary pointer changes when there is an appropriate and corresponding far end tributary pointer change except in the case when not to accept the missing or extra near end tributary pointer change may result in the dejustification/desynchronisation buffer overflowing or becoming empty.

In consequence received payload bit justifications are fed directly to the desynchronization function to cause the appropriate phase shifts of 0.488 (125/256) $\mu$s and received payload event byte justifications are also fed directly to the desynchronisation function to cause unidirectional phase shifts of 3.57 (500/140) $\mu$s.

The use of the tributary pointer to ensure byte integrity is still required with this technique.

Referring now to the decision table which specifically relates to regular forced byte justifications and where there are four input conditions namely:

an extra near end tributary pointer decrement namely an extra negative justification;

a missing near end tributary pointer decrement namely an missing negative justification;

an extra far end tributary pointer decrement;

a missing far end tributary pointer decrement.

For each received input condition the old historical register states are used to generate the new historical register states as well as sometimes to cause a phase adjustment to the tributary clock which may be an advance or a retard.

The function of the residual register is to prevent unnecessary oscillation of the phase of the recreated tributary clock when there is considerable instability in the arrival of the pointers.

The algorithm limits changes to the residual register to only occur for matched complementary pairs namely:

an extra near end tributary pointer decrement and a missing far end tributary pointer decrement;

a missing near end tributary pointer decrement and an extra far end tributary pointer decrement.

The algorithm cancels the effect of matched similar pairs namely;

an extra near end tributary pointer decrement and an extra far end tributary pointer decrement;

a missing near end tributary pointer decrement and a missing far end tributary pointer decrement.

The algorithm will also force a tributary clock phase advance or retard if a condition occurs that would force the near end historical register outside its permitted range and hence outside the range of the dejustification/desynchronization buffer.

What I claim is:

1. A telecommunications transmission system carrying multiple tributary data streams with SDH compatible multiplexing and demultiplexing arrangements comprising a multiplexor and a demultiplexor, and including a tributary justification algorithm utilizing both byte and bit justification means, wherein the byte justification means employs an offset clock with a nominal constant frequency offset from a transmission system clock so that the offset clock is used to force a regular rate of byte justifications of constant sign;

and wherein the bit justification means employs the difference between a tributary clock and the offset clock to determine the bit justifications necessary to multiplex the tributary data streams;

and wherein the bit justifications are normally of complementary sign to the forced regular byte justifications except where the frequency of the offset clock lies between the frequency of the transmission clock and the frequency of the tributary clock.

2. A telecommunications transmission system as claimed in claim 1, wherein the offset clock rate is derived from the transmission clock rate.

3. A telecommunications transmission system as claimed in claim 1 wherein a dejustification/desynchronization function of the demultiplexor receives:

tributary pointer byte justification information inserted by a multiplexor justification function and modified by any intermediate network rejustifiers;

and normally complementary tributary payload bit justification information inserted by the multiplexor justification function.

4. A telecommunications transmission system as claimed in claim 1, wherein the two least significant bits of an SDH tributary pointer are also inserted as part of tributary payload staffing information to form an event field.

5. A telecommnunications transmission system as claimed in claim 4, wherein there is also inserted as part of the tributary payload stuffing information a 2 bit phase relationship field carrying the result of the mathematical relationship (4+E−T) modulo 4: where E has the value of the event field and T has the value of the 2 least significant bits of the tributary pointer.

6. A telecommunications transmission system as claimed in claim 5, wherein a dejustification/desynchronization function of the demultiplexor receives:

tributary pointer byte justification information inserted by a multiplexor justification function and modified by any intermediate network rejustifiers;

normally complementary tributary payload bit justification information inserted by the multiplexor justification function;

the tributary payload event field;

and the tributary payload phase relationship field;

to thereby recreate the tributary clock.

7. A telecommunications transmission system as claimed in claim 6, wherein the dejustification/desynchronization function of the demultiplexor includes;

means for buffering each tributary data stream;

means for phase adjusting the recreated tributary clock for all bit justifications and regular event byte justifications;

means for determining extra and missing pointer changes relative to bits of the event field for both near and far ends of the transmission system;

means for storing information within three historical registers relating to the earlier received information;

means for operating two of the historical registers so as to enable the cancellation of similar pointer changes of said near and said far ends unless buffer overflow would result;

means for storing within the third register the occurrence of matched tributary pointer changes of said near and said far ends; and means for filter phase adjusting the recreated tributary clock whenever the third register moves outside its permitted range.

8. A telecommunications transmission system as claimed in claim 7, wherein means is provided for recording over a period of time the operating range of the third register so that the permitted range of the third register is automatically adjusted in order to remove any unnecessary hysteresis or to add any further hysteresis needed and thereby maintain the transfer characteristic of the function recreating the tributary clock.

* * * * *